United States Patent
Satake et al.

(10) Patent No.: US 10,612,480 B2
(45) Date of Patent: Apr. 7, 2020

(54) FUEL INJECTION CONTROL DEVICE

(71) Applicant: TOYOTA JIDOSHA KABUSHIKI KAISHA, Toyota-shi, Aichi-ken (JP)

(72) Inventors: Nobuyuki Satake, Kariya (JP); Eiji Murase, Nagoya (JP); Tomohiro Nakano, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/092,807

(22) PCT Filed: Apr. 7, 2017

(86) PCT No.: PCT/JP2017/014473
§ 371 (c)(1),
(2) Date: Oct. 11, 2018

(87) PCT Pub. No.: WO2017/191730
PCT Pub. Date: Nov. 9, 2017

(65) Prior Publication Data
US 2019/0170075 A1 Jun. 6, 2019

(30) Foreign Application Priority Data
May 6, 2016 (JP) .................. 2016-093317

(51) Int. Cl.
*F02D 41/04* (2006.01)
*F02D 41/20* (2006.01)
(Continued)

(52) U.S. Cl.
CPC ............. *F02D 41/04* (2013.01); *F02D 41/20* (2013.01); *F02D 41/247* (2013.01);
(Continued)

(58) Field of Classification Search
CPC ...... F02D 41/04; F02D 41/401; F02D 41/247; F02D 41/20; F02D 2200/063; F02D 2200/0614; F02D 2041/2058; F02D 2041/2055; F02D 2041/2051; F02M 51/0685
See application file for complete search history.

(56) References Cited

U.S. PATENT DOCUMENTS

2014/0069390 A1   3/2014  Nishimura et al.
2016/0177855 A1*  6/2016  Kusakabe ............... F02D 41/20
                                                    123/490
(Continued)

FOREIGN PATENT DOCUMENTS

JP   2014-234922 A    12/2014
JP   2015151871 A  *  8/2015  ........... F02D 41/247
(Continued)

OTHER PUBLICATIONS

Apr. 11, 2019 Office Action issued in European Patent Application No. 17792663.1.
(Continued)

*Primary Examiner* — Joseph J Dallo
(74) *Attorney, Agent, or Firm* — Oliff PLC

(57) ABSTRACT

A fuel injection control device includes a correction unit to calculate a correction coefficient for correcting a valve closing timing detected by an electromotive force quantity detection mode by using a valve closing timing detected by a timing detection mode. An estimation unit estimates an estimated injection quantity by using a valve closing timing after corrected by using a correction coefficient when the electromotive force quantity detection mode is selected by a selection unit and a valve closing timing is detected by the electromotive force quantity detection mode.

9 Claims, 9 Drawing Sheets

(51) Int. Cl.
*F02D 41/24* (2006.01)
*F02M 51/06* (2006.01)
*F02D 41/40* (2006.01)

(52) U.S. Cl.
CPC ....... *F02D 41/401* (2013.01); *F02M 51/0685* (2013.01); *F02D 2041/2051* (2013.01); *F02D 2041/2055* (2013.01); *F02D 2041/2058* (2013.01); *F02D 2200/063* (2013.01); *F02D 2200/0614* (2013.01)

(56) References Cited

U.S. PATENT DOCUMENTS

2016/0237937 A1* 8/2016 Kusakabe ............... F02D 41/20
2016/0245211 A1   8/2016 Katsurahara et al.

FOREIGN PATENT DOCUMENTS

| WO | 2013/191267 A1 | 12/2013 |
| WO | 2017/191728 A1 | 11/2017 |
| WO | 2017/191729 A1 | 11/2017 |
| WO | 2017/191731 A1 | 11/2017 |
| WO | 2017/191732 A1 | 11/2017 |
| WO | 2017/191733 A1 | 11/2017 |

OTHER PUBLICATIONS

Jun. 20, 2017 International Search Report issued in International Patent Application PCT/JP2017/014473.
Jun. 20, 2017 Written Opinion issued in International Patent Application PCT/JP2017/014473.

* cited by examiner

FUEL INJECTION CONTROL DEVICE

CROSS REFERENCE TO RELATED APPLICATION

This application is based on Japanese Patent Application No. 2016-93317 filed on May 6, 2016, the disclosure of which is incorporated herein by reference.

TECHNICAL FIELD

The present disclosure relates to a fuel injection control device having a fuel injection valve of an electromagnetically driven type.

BACKGROUND ART

A fuel injection control device controls injection through a fuel injection valve of an electromagnetically driven type incorporated in an internal combustion engine. Specifically, a fuel injection control device calculates a requested injection quantity in response to the operational status of an internal combustion engine and conducts a coil by an injection command pulse of a pulse width corresponding to the requested injection quantity. As a result, a magnetic attraction force is generated in the coil, a valve body of a fuel injection valve is driven to valve opening, and a fuel is controlled so as to be injected by the requested injection quantity.

In a fuel injection valve of a direct-injection type that injects a fuel of a high pressure directly into a cylinder however, the linearity of the change characteristic of an actual injection quantity to the pulse width of an injection command pulse tends to deteriorate in a partial lift region. The partial lift region means a region of a partial lift state where an injection command pulse width is short and the lift quantity of a valve body does not reach a full lift position. In such a partial lift region, the variation of the lift quantity of a valve body increases and the variation of an injection quantity tends to increase. If the variation of an injection quantity increases, exhaust emission and drivability may deteriorate undesirably.

In a partial lift region, the variation of the lift quantity of a valve body is large and hence the variation of time from the start of valve closing to the finish of the valve closing is also large. When the timing of valve closing by a valve body can be detected in a partial lift region however, deviation between an injection command pulse from a fuel injection control device and actual valve behavior can be recognized by the fuel injection control device. Consequently, it is possible to correct an injection command pulse on the basis of the deviation and control an injection quantity. A technology of detecting the timing of valve closing is disclosed accordingly.

In a fuel injection valve, an induced electromotive force is generated in a coil in proportion to the displacement of a valve body after an injection command pulse is turned off. Since a terminal voltage of the fuel injection valve varies by the generated induced electromotive force therefore, the induced electromotive force can be detected. Two modes of detecting the timing of valve closing by using such an induced electromotive force generated in a coil are disclosed. In Patent Literature 1, as the detection of an induced electromotive force quantity, the difference of an induced electromotive force quantity generated during valve closing caused by the difference of a lift quantity is detected. In Patent Literature 2, as timing detection, an inflection point of an induced electromotive force responding to the drive variation of a movable core after a valve body is seated is detected by using a terminal voltage.

PRIOR ART LITERATURES

Patent Literature

Patent Literature 1: JP2015-96720A
Patent Literature 2: WO2013/191267A

SUMMARY OF INVENTION

When induced electromotive force quantity detection and timing detection are compared, the detection range in the induced electromotive force quantity detection is wider. In the timing detection, a lift quantity of a certain extent is required for generating an inflection point and hence a timing of valve closing cannot be detected by the timing detection when the lift quantity is small.

Further, when induced electromotive force quantity detection and timing detection are compared, the detection accuracy in the timing detection is superior. In the induced electromotive force quantity detection, an electromotive force quantity tends to be influenced by external disturbance and hence the detection accuracy may deteriorate undesirably. In the timing detection, an inflection point is detected and hence the detection accuracy is superior.

In this way, when induced electromotive force quantity detection and timing detection are compared, they have advantages and disadvantages respectively and hence it is desirable to detect a timing of valve closing by both of the detection modes simultaneously. In order to execute both of the detection modes however, processing capabilities have to be increased and the implementation scale of a control device may increase undesirably.

An object of the present disclosure is to provide a fuel injection control device capable of securing both of detection accuracy and detection range while the upsizing of the control device is suppressed.

According to an aspect of the present disclosure, the fuel injection control device includes a correction unit to calculate a correction coefficient for correcting a valve closing timing detected by an electromotive force quantity detection mode by using the valve closing timing detected by a timing detection mode. An estimation unit calculates an estimated injection quantity by using the valve closing timing after corrected by using the correction coefficient when the selection unit selects the electromotive quantity detection mode and the valve closing timing is detected by the electromotive force quantity detection mode.

According to the present disclosure, the valve closing detection unit can execute either of an electromotive force quantity detection mode and a timing detection mode. Consequently, the valve closing detection unit can be downsized further than a configuration of execute both of the modes simultaneously. The timing detection mode is superior to the electromotive force quantity detection mode in detection accuracy but has a detection range narrower than the electromotive force quantity detection mode. Thus the correction unit calculates the correction coefficient for correcting the valve closing timing detected by the electromotive force quantity detection mode by using the valve closing timing detected by the timing detection mode. As a result, the valve closing timing detected by the electromotive force quantity detection mode can be corrected by using the valve closing timing of the timing detection mode of good detection accuracy. The detection accuracy of the electromotive force quantity detection mode therefore can be improved. As a result, the valve closing timing can be detected by the electromotive force quantity detection mode of an improved accuracy even in a detection range not detectable by the timing detection mode. Then the estimation unit calculates an estimated injection quantity by using not the valve closing timing detected by the electromotive force quantity detection mode but the valve closing timing after corrected by the correction coefficient. As a result, the accuracy of the estimated injection quantity can be improved more than the valve closing timing detected by the electromotive force quantity detection mode.

BRIEF DESCRIPTION OF DRAWINGS

The above and other objects, features and advantages of the present disclosure will become more apparent from the following detailed description made with reference to the accompanying drawings. In the drawings.

DESCRIPTION OF EMBODIMENTS

First Embodiment

Figure 1:
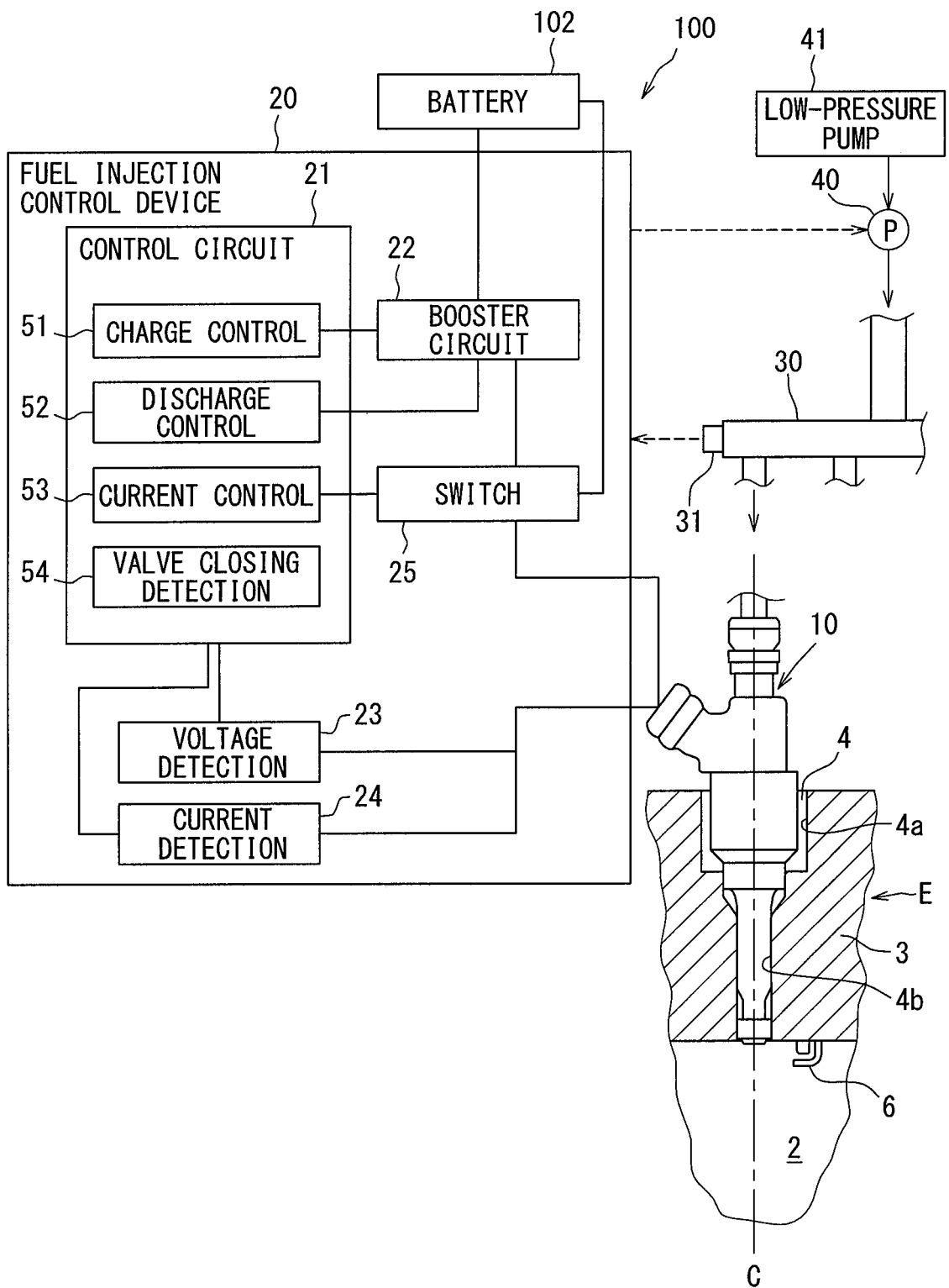
FIG. 1 is a view showing a fuel injection system according to a first embodiment.

A first embodiment according to the present disclosure is explained in reference to FIGS. 1 to 10. A fuel injection system 100 shown in FIG. 1 includes a plurality of fuel injection valves 10 and a fuel injection control device 20. The fuel injection control device 20 controls the opening and closing of the fuel injection valves 10 and controls fuel injection into a combustion chamber 2 of an internal combustion engine E. The fuel injection valves 10: are installed in an internal combustion engine E of an ignition type, for example a gasoline engine; and inject a fuel directly into a plurality of combustion chambers 2 of the internal combustion engine E respectively. A mounting hole 4 penetrating concentrically with an axis C of a cylinder is formed in a cylinder head 3 constituting the combustion chamber 2. A fuel injection valve 10 is inserted into and fixed to the mounting hole 4 so that the tip may be exposed into the combustion chamber 2.

A fuel supplied to the fuel injection valve 10 is stored in a fuel tank not shown in the figure. The fuel in the fuel tank is pumped up by a low-pressure pump 41, the fuel pressure is raised by a high-pressure pump 40, and the fuel is sent to a delivery pipe 30. The high-pressure fuel in the delivery pipe 30 is distributed and supplied to the fuel injection valve 10 of each cylinder. A spark plug 6 is attached to a position of the cylinder head 3 facing the combustion chamber 2. Further, the spark plug 6 is arranged in a vicinity of the tip of the fuel injection valve 10.

Figure 2:
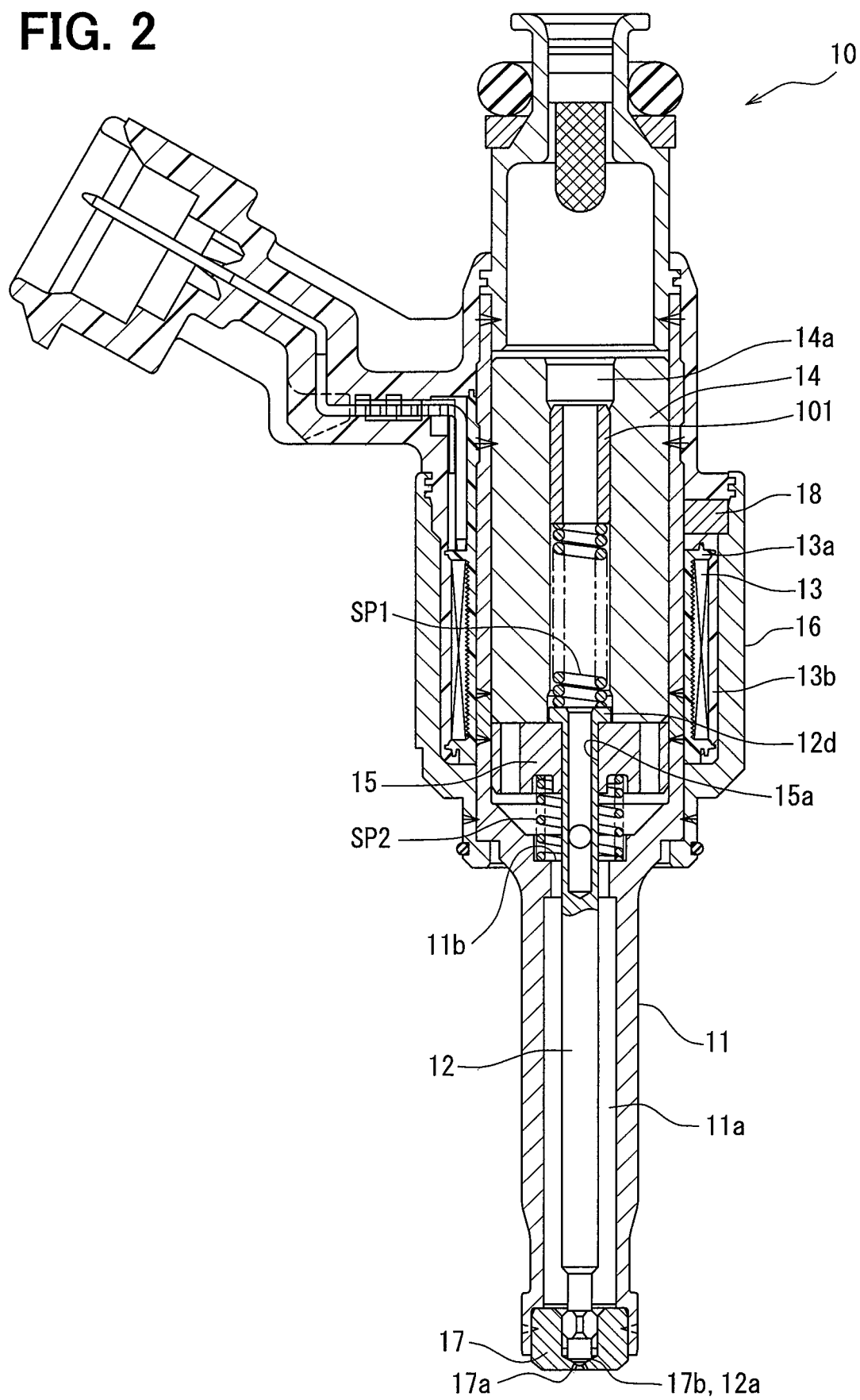
FIG. 2 is a sectional view showing a fuel injection valve.

The configuration of the fuel injection valve 10 is explained hereunder in reference to FIG. 2. As shown in FIG. 2, the fuel injection valve 10 includes a body 11, a valve body 12, a drive coil 13, a stator core 14, a movable core 15, and a housing 16. The body 11 comprises a magnetic material. A fuel passage 11a is formed in the interior of the body 11.

Further, the valve body 12 is contained in the interior of the body 11. The valve body 12 comprises a metal material and is formed cylindrically as a whole. The valve body 12 can be displaced reciprocally in an axial direction in the interior of the body 11. The body 11 is configured so as to have an injection hole body 17 in which a valve seat 17b where the valve body 12 is seated and an injection hole 17a to inject a fuel are formed at the tip part.

The injection hole 17a is formed at the tip part of the body 11 inserted into the combustion chamber 2 in the insertion direction. The tip part of the body 11 is formed conically or hemispherically. The injection hole 17a includes a plurality of holes formed radially from the inside toward the outside of the body 11. A fuel of a high pressure is injected into the combustion chamber 2 through the injection hole 17a. The fuel is vaporized by passing through the injection hole 17a and is in the state of being likely to be mixed with air.

The main body part of the valve body 12 has a columnar shape. The tip part of the valve body 12 has a conical shape extending from the tip of the main body part on the side of the injection hole 17a toward the injection hole 17a. The part, which is seated on the valve seat 17b, of the valve body 12 is a seat surface 12a. The seat surface 12a is formed at the tip part of the valve body 12.

When the valve body 12 is operated for valve closing so as to seat the seat surface 12a on the valve seat 17b, fuel injection from the injection hole 17a is stopped. When the valve body 12 is operated for valve opening so as to separate the seat surface 12a from the valve seat 17b, a fuel is injected through the injection hole 17a.

The drive coil 13 is an actuator and gives a magnetic attraction force to the movable core 15 in a valve opening direction. The drive coil 13 is configured by being wound around a resin-made bobbin 13a and is sealed by the bobbin 13a and a resin material 13b. In other words, a coil body of a cylindrical shape includes the drive coil 13, the bobbin 13a, and the resin material 13b. The bobbin 13a is inserted over the outer peripheral surface of the body 11.

The stator core 14 is a stator and is fixed to the body 11. The stator core 14 comprises a magnetic material and is formed cylindrically. A fuel passage 14a is formed in the interior of the cylinder of the stator core 14. The stator core 14 is inserted at a position opposite to the bobbin 13a over the inner peripheral surface of the body 11.

Further, the outer peripheral surface of the resin material 13b to seal the drive coil 13 is covered with the housing 16. The housing 16 comprises a metallic magnetic material and is formed cylindrically. A lid member 18 comprising a metallic magnetic material is attached to an opening end part of the housing 16. Consequently, the coil body is surrounded by the body 11, the housing 16, and the lid member 18.

The movable core 15 is a mover and is retained by the valve body 12 relatively displaceably in the direction of driving the valve body 12. The movable core 15 comprises a metallic magnetic material, is formed discoidally, and is inserted over the inner peripheral surface of the body 11. The body 11, the valve body 12, the coil body, the stator core 14, the movable core 15, and the housing 16 are arranged so that the center lines of them may coincide with each other. Then the movable core 15 is arranged on the side of the stator core 14 closer to the injection hole 17a and faces the stator core 14 in the manner of having a prescribed gap from the stator core 14 when the drive coil 13 is not conducted.

The body 11, the housing 16, the lid member 18, and the stator core 14, which surround the coil body: comprise magnetic materials as stated earlier; and hence form a magnetic circuit acting as a pathway of a magnetic flux generated when the drive coil 13 is conducted.

As shown in FIG. 1, the outer peripheral surface of a part of the body 11 located on the side closer to the injection hole 17a than the housing 16 is in contact with an inner peripheral surface 4b of the mounting hole 4 on the lower side. Further, the outer peripheral surface of the housing 16 forms a gap from an inner peripheral surface 4a of the mounting hole 4 on the upper side.

A through hole 15a is formed in the movable core 15 and, by inserting the valve body 12 into the through hole 15a, the valve body 12 is assembled to the movable core 15 slidably and relatively movably. A locking part 12d formed by expanding the diameter from the main body part is formed at an end part, which is located on the upper side in FIG. 2, of the valve body 12 on the side opposite to the injection hole. When the movable core 15 is attracted by the stator core 14 and moves upward, the locking part 12d moves in the state of being locked to the movable core 15 and hence the valve body 12 also moves in response to the upward movement of the movable core 15. Even in the state of bringing the movable core 15 into contact with the stator core 14, the valve body 12 can move relatively to the movable core 15 and can lift up.

A main spring SP1 is arranged on the side of the valve body 12 opposite to the injection hole and a sub spring SP2 is arranged on the side of the movable core 15 closer to the injection hole 17a. The main spring SP1 and the sub spring SP2 are coil-shaped and deform resiliently in an axial direction. A resilient force of the main spring SP1 is given to the valve body 12 in the direction of valve closing that is the downward direction in FIG. 2 as a counter force coming from an adjustment pipe 101. A resilient force of the sub spring SP2 is given to the movable core 15 in the direction of attracting the movable core 15 as a counter force coming from a recess 11b of the body 11.

In short, the valve body 12 is interposed between the main spring SP1 and the valve seat 17b and the movable core 15 is interposed between the sub spring SP2 and the locking part 12d. Then the resilient force of the sub spring SP2 is transferred to the locking part 12d through the movable core 15 and is given to the valve body 12 in the direction of valve opening. It can also be said therefore that a resilient force obtained by subtracting a sub resilient force from a main resilient force is given to the valve body 12 in the direction of valve closing.

Here, the pressure of a fuel in the fuel passage 11a is applied to the whole surface of the valve body 12 but a force of pushing the valve body 12 toward the valve closing side is larger than a force of pushing the valve body 12 toward the valve opening side. The valve body 12 therefore is pushed by the fuel pressure in the direction of valve closing. During valve closing, the fuel pressure is not applied to the surface of a part of the valve body 12 located on the downstream side of the seat surface 12a. Then along with valve opening, the pressure of a fuel flowing into the tip part increases gradually and a force of pushing the tip part toward valve opening side increases. The fuel pressure in the vicinity of the tip part therefore increases in accordance with the valve opening and resultantly the fuel pressure valve closing force decreases. For the above reason, the fuel pressure valve closing force is maximum during valve closing and reduces gradually as the degree of the movement of the valve body 12 toward valve opening increases.

The behavior of the drive coil 13 by conduction is explained hereunder. When the drive coil 13 is conducted and an electromagnetic attraction force is generated in the stator core 14, the movable core 15 is attracted toward the stator core 14 by the electromagnetic attraction force. The electromagnetic attraction force is also called an electromagnetic force. As a result, the valve body 12 connected to the movable core 15 operates for valve opening against the resilient force of the main spring SP1 and the fuel pressure valve closing force. On the other hand, when the conduction of the drive coil 13 is stopped, the valve body 12 operates for valve closing together with the movable core 15 by the resilient force of the main spring SP1.

The configuration of the fuel injection control device 20 is explained hereunder. The fuel injection control device 20 is operated by an electronic control unit (called ECU for short). The fuel injection control device 20 includes a control circuit 21, a booster circuit 22, a voltage detection unit 23, a current detection unit 24, and a switch unit 25. The control circuit 21 is also called a microcomputer. The fuel injection control device 20 receives information from various sensors. For example, a fuel pressure supplied to the fuel injection valve 10 is detected by a fuel pressure sensor 31 attached to the delivery pipe 30 and the detection result is given to the fuel injection control device 20 as shown in FIG. 1. The fuel injection control device 20 controls the drive of the high-pressure pump 40 on the basis of the detection result of the fuel pressure sensor 31.

The control circuit 21 includes a central processing unit, a non-volatile memory (ROM), a volatile memory (RAM), and the like and calculates a requested injection quantity and a requested injection start time of a fuel on the basis of a load and a machine rotational speed of an internal combustion engine E. The storage mediums such as a ROM and a RAM are non-transitive tangible storage mediums to non-temporarily store programs and data that are readable by a computer. The control circuit 21: functions as an injection control unit; tests and stores an injection characteristic showing a relationship between a conduction time Ti and an injection quantity Q in the ROM beforehand; controls the conduction time Ti to the drive coil 13 in accordance with the injection characteristic; and thus controls the injection quantity Q. The conduction time Ti to the drive coil 13 is a pulse width of an injection command pulse and is also called an injection command pulse width Ti. Further, the control circuit 21 functions as an estimation unit and estimates an injection quantity on the basis of the obtained data.

The voltage detection unit 23 and the current detection unit 24 detect a voltage and an electric current applied to the drive coil 13 and give the detection results to the control circuit 21. The voltage detection unit 23 detects a minus terminal voltage of the drive coil 13. The voltage detection unit 23 detects the variation of an induced electromotive force caused by intercepting the electric current supplied to the drive coil 13 and displacing the valve body 12 and the movable core 15 in the valve closing direction as a voltage value. Further, the voltage detection unit 23 detects the variation of an induced electromotive force caused by displacing the movable core 15 relatively to the valve body 12 after the valve seat 17b comes into contact with the valve body 12 as a voltage value. A valve closing detection unit 54 detects a valve closing timing when the valve body 12 operates for valve closing by using a detected voltage.

The control circuit 21 has a charge control unit 51, a discharge control unit 52, a current control unit 53, and the valve closing detection unit 54. The booster circuit 22 and the switch unit 25 operate on the basis of an injection command pulse outputted from the control circuit 21. The injection command pulse is a signal to command a state of conducting the drive coil 13 of the fuel injection valve 10 and is set by using a requested injection quantity and a requested injection start time. The injection command pulse includes an injection signal and a boost signal.

The booster circuit 22 applies a boosted boost voltage to the drive coil 13. The booster circuit 22 has a condenser, a coil and a switching element and a battery voltage applied from a battery terminal of a battery 102 is boosted by the drive coil 13 and stored in the condenser. The booster circuit 22 controls the timing of boost by the charge control unit 51. Further, the booster circuit 22 controls the timing of discharge by the discharge control unit 52. In this way, a voltage of a boosted and stored electric power corresponds to a boost voltage.

When the discharge control unit 52 turns on a prescribed switching element so that the booster circuit 22 may discharge, a boost voltage is applied to the drive coil 13 of the fuel injection valve 10. The discharge control unit 52 turns off the prescribed switching element of the booster circuit 22 when stopping applying voltage to the drive coil 13.

The current control unit 53 controls on or off of the switch unit 25 and controls the electric current flowing in the drive coil 13 by using a detection result of the current detection unit 24. The switch unit 25 applies a battery voltage or a boost voltage from the booster circuit 22 to the drive coil 13 in an on state and stops the application in an off state. The current control unit 53, at a voltage application start time commanded by an injection command pulse for example: turns on the switch unit 25; applies a boost voltage; and starts conduction. Then a coil current increases in accordance with the start of the conduction. Then the current control unit 53 turns off the conduction when a detected coil current value reaches a target value on the basis of a detection result of the current detection unit 24. In short, the current control unit 53 controls a coil current so as to be raised to a target value by applying a boost voltage through initial conduction. Further, the current control unit 53 controls conduction by a battery voltage so that a coil current may be maintained at a value lower than a target value after a boost voltage is applied.

Figure 3:
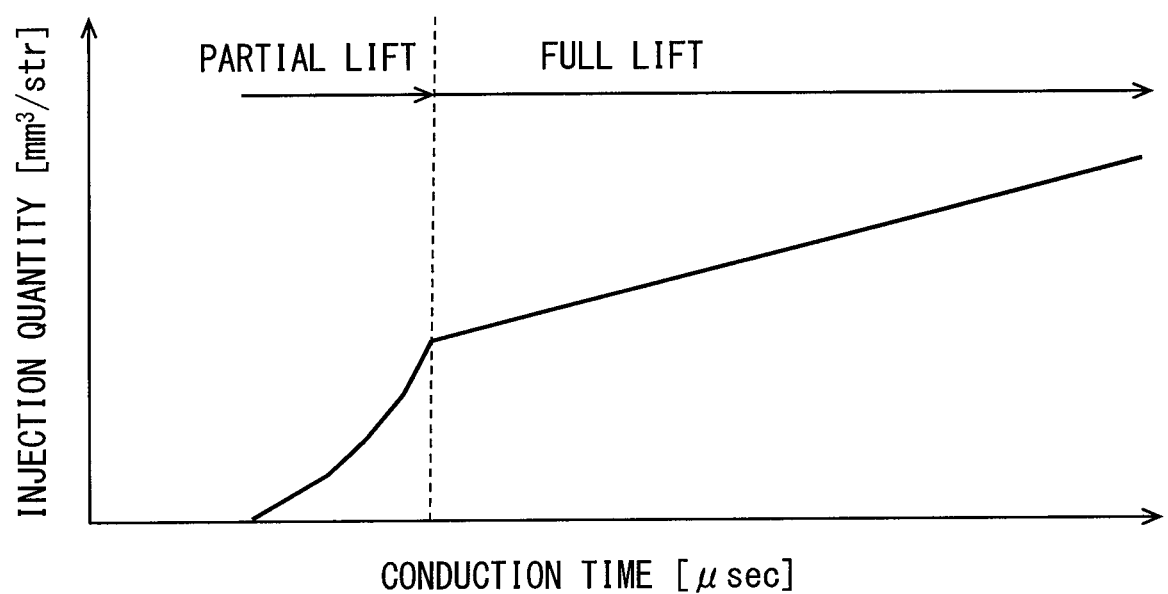
FIG. 3 is a graph showing a relationship between a conduction time and an injection quantity.

As shown in FIG. 3, in a full lift region where an injection command pulse width is comparatively long, the lift quantity of the valve body 12 reaches a full lift position, namely a position where the movable core 15 abuts on the stator core 14. In a partial lift region where an injection command pulse width is comparatively short however, a partial lift state where the lift quantity of the valve body 12 does not reach a full lift position, namely a state before the movable core 15 abuts on the stator core 14, is caused.

The fuel injection control device 20, in a full lift region, executes full lift injection of driving the fuel injection valve 10 for valve opening by an injection command pulse allowing the lift quantity of the valve body 12 to reach a full lift position. Further, the fuel injection control device 20, in a partial lift region, executes partial lift injection of driving the fuel injection valve 10 for valve opening by an injection command pulse causing a partial lift state where the lift quantity of the valve body 12 does not reach a full lift position.

Figure 4:
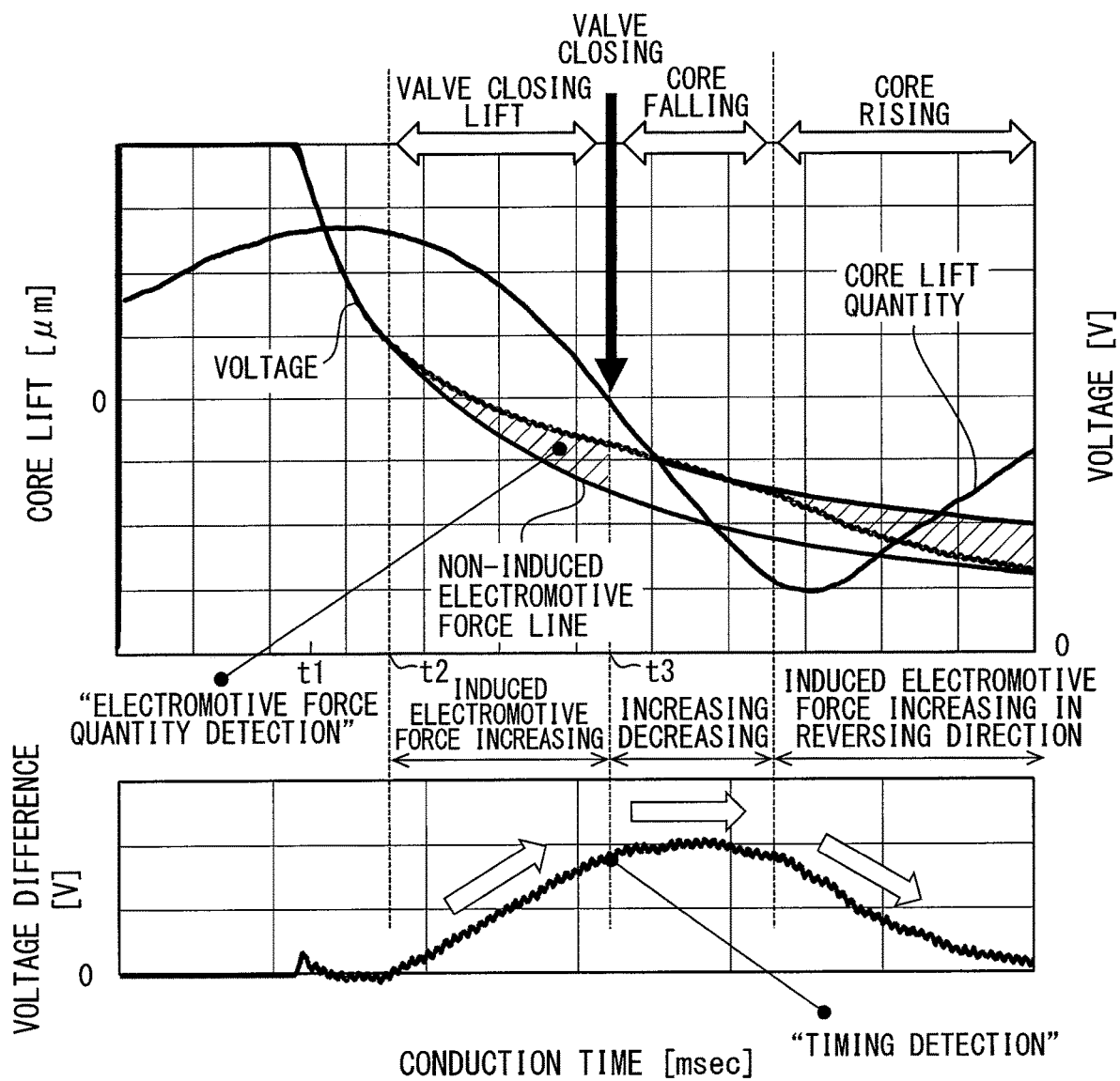
FIG. 4 is a graph showing the behavior of a valve body.

A detection mode of the valve closing detection unit 54 is explained hereunder in reference to FIG. 4. The graph at the upper part in FIG. 4 shows a waveform of minus terminal voltage of the drive coil 13 after conduction is switched from on to off and enlargedly shows a waveform of flyback voltage when conduction is switched off. The flyback voltage is a negative value and hence is shown upside down in FIG. 4. In other words, a waveform of voltage obtained by reversing the positive and negative is shown in FIG. 4.

The valve closing detection unit 54: can execute an electromotive force quantity detection mode and a timing detection mode; and detects a valve closing timing when the valve body 12 shifts to valve closing by using either of the detection modes. The electromotive force quantity detection mode detects a valve closing timing by comparing an accumulated quantity of voltage values detected by the voltage detection unit 23 and a prescribed reference quantity in order to detect a valve closing timing in partial lift injection. The timing detection mode detects an inflection point of voltage values detected by the voltage detection unit 23 as a valve closing timing.

Firstly, the electromotive force quantity detection mode is explained. In the fuel injection valve 10, as shown in FIG. 4, a minus terminal voltage varies by an induced electromotive force after the time t1 when an injection command pulse is switched off. When a waveform of detected electric power and a waveform of no induced electromotive force are compared, it is obvious that a voltage increases to the extent of the induced electromotive force in the waveform of the detected electric power value as shown with the oblique lines in FIG. 4. An induced electromotive force is generated when the movable core 15 passes through a magnetic field during the time from the start of valve closing to the finish of valve closing. Since the change rate of the valve body 12 and the change rate of the movable core 15 vary comparatively largely and the change characteristic of a minus terminal voltage varies at the valve closing timing of the valve body 12, a voltage inflection point where the change characteristic of a minus terminal voltage varies appears in the vicinity of the valve closing timing.

By paying attention to such a characteristic, the valve closing detection unit 54 detects a voltage inflection point time as information related to a valve closing timing as follows. The detection of a valve closing timing shown below is executed for each of the cylinders. The valve closing detection unit 54 calculates a first filtered voltage Vsm1 obtained by filtering (smoothing) a minus terminal voltage Vm of the fuel injection valve 10 with a first low-pass filter during the implementation of partial lift injection at least after an injection command pulse of the partial lift injection is switched off. The first low-pass filter uses a first frequency lower than the frequency of a noise component as the cut-off frequency. Further, the valve closing detection unit 54 calculates a second filtered voltage Vsm2 obtained by filtering (smoothing) the minus terminal voltage Vm of the fuel injection valve 10 with a second low-pass filter using a second frequency lower than the first frequency as the cut-off frequency. As a result, the first filtered voltage Vsm1 obtained by removing a noise component from a minus terminal voltage Vm and the second filtered voltage Vsm2 used for voltage inflection point detection can be calculated.

Figure 5:
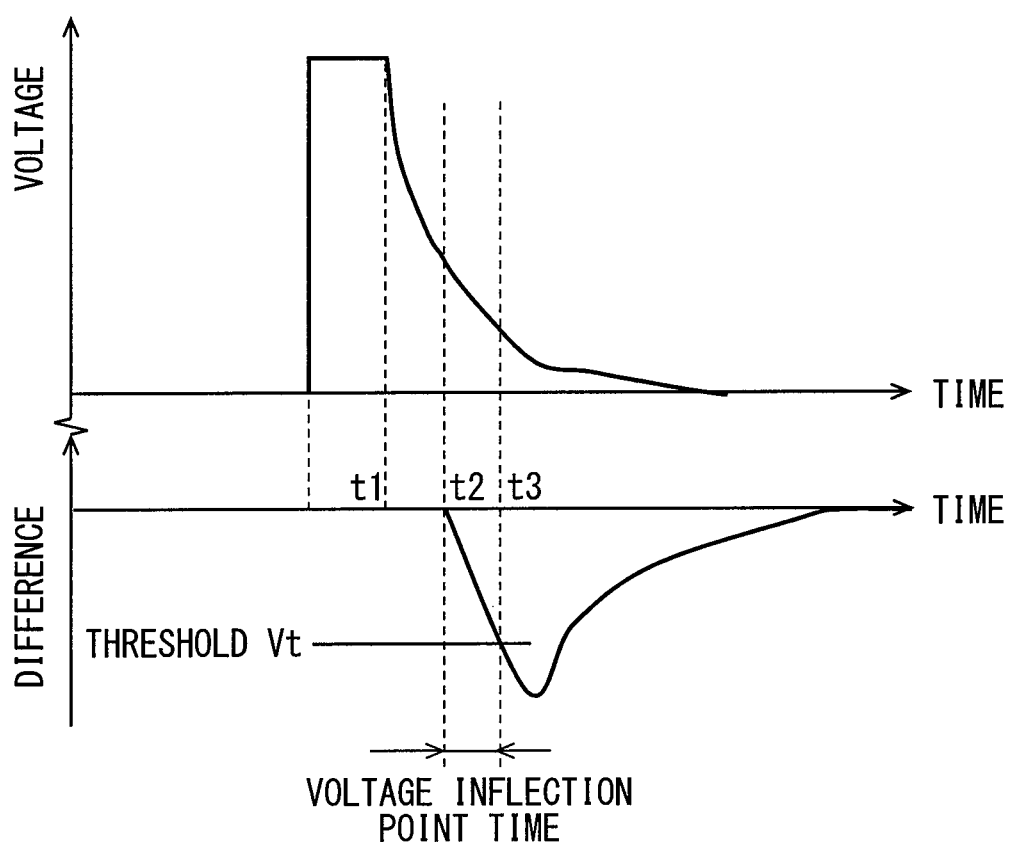
FIG. 5 is a graph showing a relationship between a voltage and a difference.
Figure 6:
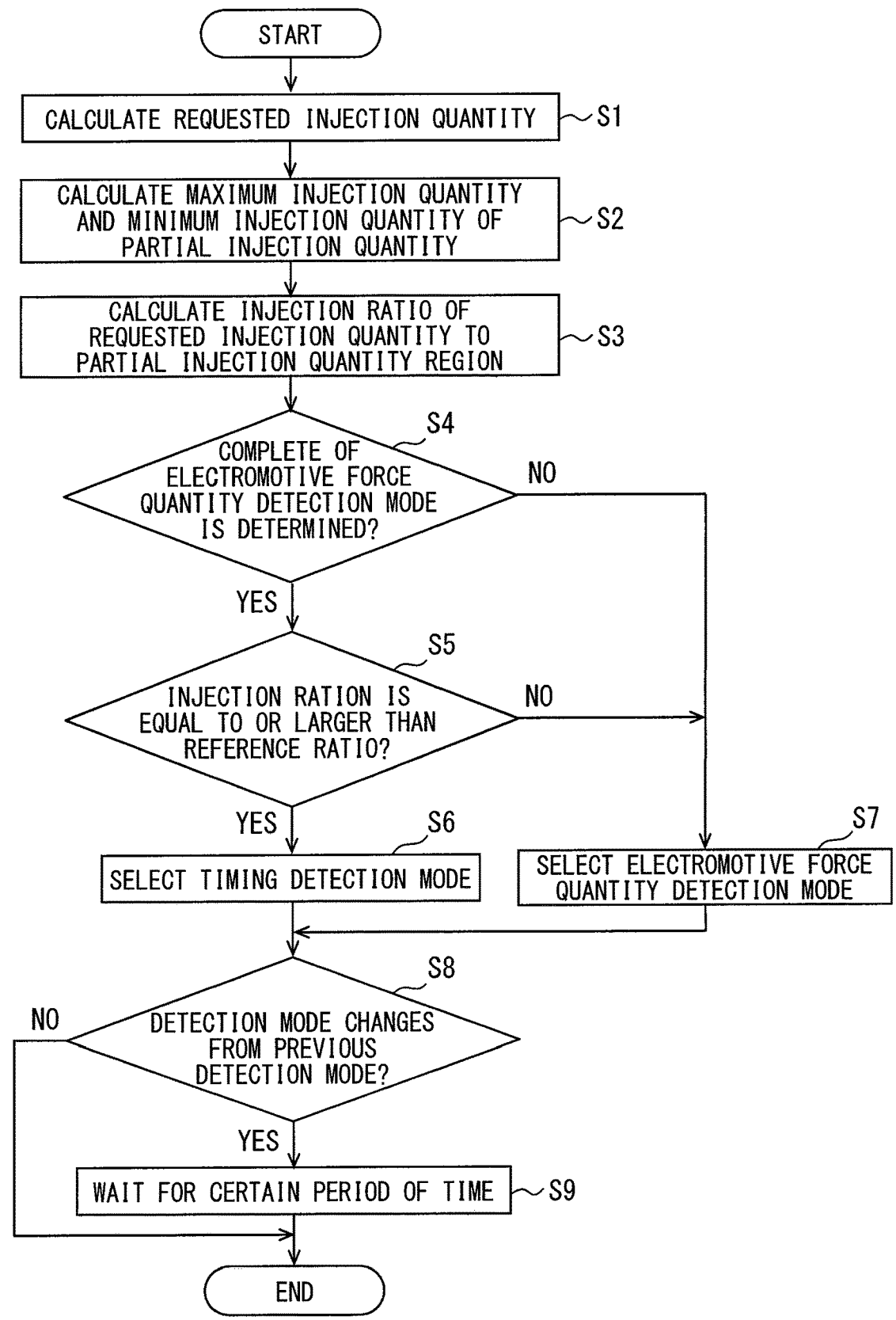
FIG. 6 is a flowchart showing selection processing.

Further, the valve closing detection unit 54 calculates a difference Vdiff (=Vsm1−Vsm2) between the first filtered voltage Vsm1 and the second filtered voltage Vsm2. Furthermore, the valve closing detection unit 54 calculates a time from a prescribed reference timing to a timing when the difference Vdiff comes to be an inflection point as a voltage inflection point time Tdiff. On this occasion, as shown in FIG. 5, the voltage inflection point time Tdiff is calculated by regarding a timing when the difference Vdiff exceeds a prescribed threshold value Vt as a timing when the difference Vdiff comes to be an inflection point. In other words, a time from a prescribed reference timing to a timing when a difference Vdiff exceeds a prescribed threshold value Vt is calculated as the voltage inflection point time Tdiff. The difference Vdiff corresponds to an accumulated value of induced electromotive forces and the threshold value Vt corresponds to a prescribed reference quantity. As a result, the voltage inflection point time Tdiff that varies in response to the valve closing timing of the fuel injection valve 10 can be calculated with a high degree of accuracy. In the present embodiment, the voltage inflection point time Tdiff is calculated by regarding the reference timing as a time t2 when the difference is generated. The threshold value Vt is a fixed value or a value calculated by the control circuit 21 in response to a fuel pressure, a fuel temperature, and others.

In a partial lift region of the fuel injection valve 10, since an injection quantity varies and also a valve closing timing varies by the variation of a lift quantity of the fuel injection valve 10, there is a correlation between an injection quantity and a valve closing timing of the fuel injection valve 10. Further, since a voltage inflection point time Tdiff varies in response to the valve closing timing of the fuel injection valve 10, there is a correlation between a voltage inflection point time Tdiff and an injection quantity. By paying attention to such correlations, an injection command pulse correction routine is executed by the fuel injection control device 20 and hence an injection command pulse in partial lift injection is corrected on the basis of a voltage inflection point time Tdiff.

The fuel injection control device 20 stores a relationship between a voltage inflection point time Tdiff and an injection quantity Q beforehand in the control circuit 21 for each of a plurality of injection command pulse widths Ti in partial lift injection. Then the control circuit 21 estimates an injection quantity Q corresponding to a calculated voltage inflection point time Tdiff for each of the injection command pulse widths Ti by using a relationship between a voltage inflection point time Tdiff and an injection quantity Q for each of the injection command pulse widths Ti stored in a ROM beforehand.

Further, a relationship between an injection command pulse width Ti and an injection quantity Q is set on the basis of the estimation result. As a result, it is possible to: set a relationship between an injection command pulse width Ti and an injection quantity Q corresponding to a current injection characteristic of the fuel injection valve 10; and correct the relationship between the injection command pulse width Ti and the injection quantity Q. Successively, a requested injection command pulse width Tireq responding to a requested injection quantity Qreq is calculated by using a map defining the relationship between the injection command pulse width Ti and the injection quantity Q.

The timing detection mode is explained hereunder. At a moment when the valve body 12 starts valve closing from a valve opening state and comes into contact with the valve seat 17b, since the movable core 15 separates from the valve body 12, the acceleration of the movable core 15 varies at the moment when the valve body 12 comes into contact with the valve seat 17b. In the timing detection mode, a valve closing timing is detected by detecting the variation of the acceleration of the movable core 15 as the variation of an induced electromotive force generated in the drive coil 13. The variation of the acceleration of the movable core 15 can be detected by a second-order differential value of a voltage detected by the voltage detection unit 23.

Specifically, as shown in FIG. 4, after the conduction to the drive coil 13 is stopped at the time t1, the movable core 15 switches from upward displacement to downward displacement in conjunction with the valve body 12. Then when the movable core 15 separates from the valve body 12 after the valve body 12 shifts to valve closing, a force in the valve closing direction that has heretofore been acting on the movable core 15 through the valve body 12, namely a force caused by a load by the main spring SP1 and a fuel pressure, disappears. A load of the sub spring SP2 therefore acts on the movable core 15 as a force in the valve opening direction. When the valve body 12 reaches a valve closing position and the direction of the force acting on the movable core 15 changes from the valve closing direction to the valve opening direction, the increase of an induced electromotive force that has heretofore been increasing gently reduces and the second-order differential value of a voltage turns downward at the valve closing time t3. By detecting the maximum value of the second-order differential value of a minus terminal voltage by the valve closing detection unit 54, a valve closing timing of the valve body 12 can be detected with a high degree of accuracy.

Similarly to the electromotive force quantity detection mode, there is a correlation between a valve closing time from the stop of conduction to a valve closing timing and an injection quantity. By paying attention to such a correlation, an injection command pulse correction routine is executed by the fuel injection control device 20 and thus an injection command pulse in partial lift injection is corrected on the basis of the valve closing time.

The fuel injection control device 20 stores a relationship between a valve closing time detected by the timing detection mode and an injection quantity Q beforehand in the control circuit 21 for each of a plurality of injection command pulse widths Ti in partial lift injection. Then the control circuit 21 estimates an injection quantity Q corresponding to a calculated valve closing time for each of the injection command pulse widths Ti by using a relationship between a valve closing time and an injection quantity Q for each of the injection command pulse widths Ti stored in a ROM beforehand.

Further, similarly to the electromotive force quantity detection mode stated earlier, a relationship between an injection command pulse width Ti and an injection quantity Q is set on the basis of the estimation result. As a result, similarly to the electromotive force quantity detection mode, it is possible to: set a relationship between an injection command pulse width Ti and an injection quantity Q corresponding to a current injection characteristic of the fuel injection valve 10; and correct the relationship between the injection command pulse width Ti and the injection quantity Q. Successively, a requested injection command pulse width Tireq responding to a requested injection quantity Qreq is calculated by using a map defining the relationship between the injection command pulse width Ti and the injection quantity Q.

Selection processing of selecting a detection mode is explained hereunder. The selection processing is executed repeatedly for a short period of time in the state of the power-up of the control circuit 21 functioning as a selection unit.

At S1, a requested injection quantity of a fuel is calculated on the basis of a load and a machine rotational speed of an internal combustion engine E and the process proceeds to S2. Here, the requested injection quantity is at least a value corrected by initial correction. In other words, the requested injection quantity is a value that is corrected by a correction coefficient and is less different from an estimated injection quantity. Concrete correction processing is described later.

At S2, a maximum injection quantity and a minimum injection quantity of a partial injection quantity are calculated and the process proceeds to S3. The partial injection quantity is an injection quantity in a partial lift region. The partial injection quantity varies by the deterioration of the fuel injection valve 10 and the like. Then the deterioration of the fuel injection valve 10 and the like are addressed by reflecting correction ratios to the maximum injection quantity and the minimum injection quantity, those acting as references, namely nominal characteristics. Specifically, at S2, the maximum injection quantity and the minimum injection quantity in partial lift injection are corrected by using a valve closing timing stated earlier.

At S3, an injection ratio of the requested injection quantity to a partial injection quantity region is calculated and the process proceeds to S4. The partial injection quantity region is an injection range between the maximum injection quantity and the minimum injection quantity in partial lift injection. Since the maximum injection quantity and the minimum injection quantity at S2 are post-correction values that have been corrected, the partial injection quantity region can be set with a high degree of accuracy.

At S4, whether or not correction processing in the electromotive force quantity detection mode is completed is determined and the process proceeds to S5 when the correction processing is completed and to S7 when the correction processing is not completed. The correction processing is described later in reference to FIG. 8.

At S5, the calculated injection ratio and a prescribed reference ratio are compared and the process proceeds to S6 when the calculated injection ratio is equal to or larger than the reference ratio and to S7 when the calculated injection ratio is not equal to or larger than the reference ratio. The reference ratio is determined preferably so as to have a hysteresis using a first threshold value and a second threshold value smaller than the first threshold value. The value of the reference ratio used at S5 therefore varies by a current detection mode. Specifically, the reference ratio is set at the first threshold value while the electromotive force quantity detection mode is selected and the reference ratio is set at the second threshold value while the timing selection mode is selected.

At S6, since a calculated injection ratio is equal to or larger than a reference ratio, the timing detection mode is selected as the detection mode and the process proceeds to S8. At S7, since the calculated injection ratio is smaller than the reference ratio or the correction processing is not completed, the electromotive force quantity detection mode is selected as the detection mode and the process proceeds to S8.

At S8, whether or not a selected detection mode changes from the previous detection mode is determined and the process proceeds to S9 when the selected detection mode changes and to S9 when the selected detection mode does not change. At S9, since the detection mode has changed, the process waits without applying a next detection mode for a certain period of time, for example for one cycle, and the process finishes. When the detection mode is switched in this way, the last detection mode before the switching is maintained until a newly selected detection mode is available. In other words, when a detection mode changes, the detection mode is not switched immediately, is prohibited from being changed for a prescribed period of time, and is switched to a next detection mode after the lapse of the prescribed period of time.

Figure 7:
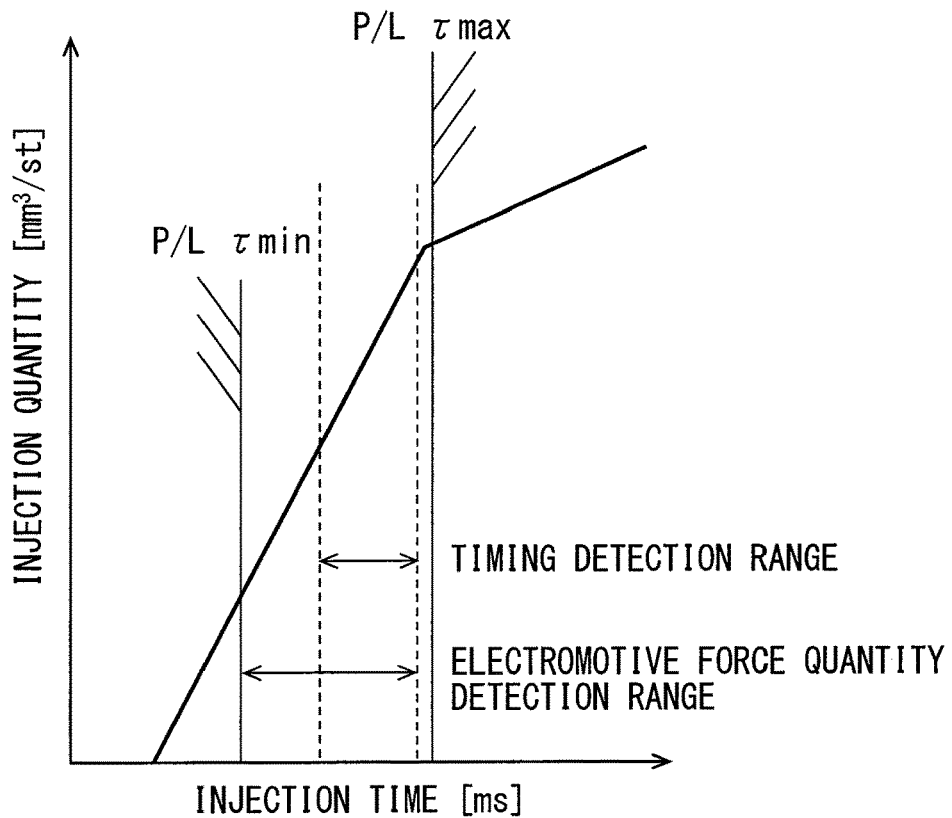
FIG. 7 is a graph for explaining a detection range.

As shown in FIG. 7, an injection time varies in response to a requested injection quantity. Then in a partial lift region, the detection range of the electromotive force quantity detection mode and the detection range of the timing detection mode are different from each other. Specifically, the detection range of the timing detection mode is located on the side where a required injection quantity is larger than a reference ratio in the partial lift region. The electromotive force quantity detection mode covers from a minimum injection quantity Tmin to a value in the vicinity of a maximum injection quantity Tmax. The detection range of the electromotive force quantity detection mode therefore includes the detection range of the timing detection mode and is wider than the detection range of the timing detection mode. The detection accuracy of a valve closing timing in the timing detection mode however is superior. As explained in FIG. 6 stated earlier therefore, the detection mode is switched on the basis of a requested injection quantity.

Figure 8:
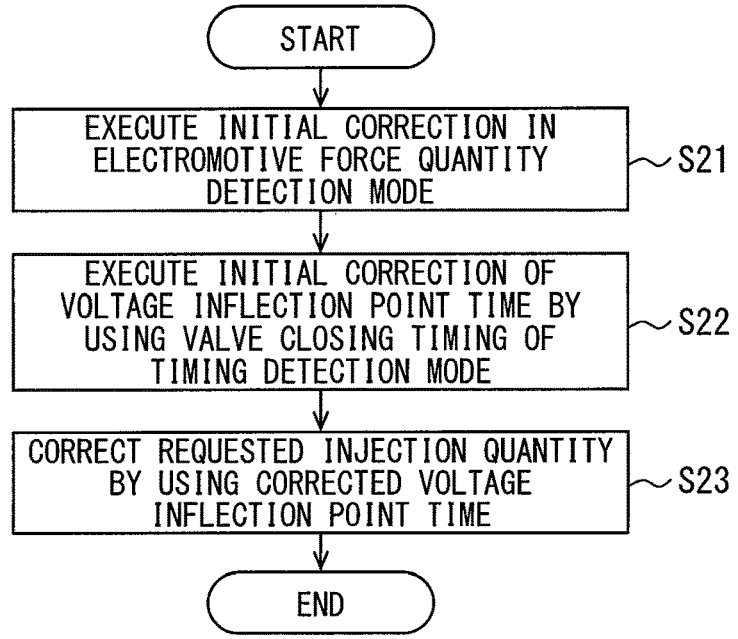
FIG. 8 is a flowchart showing correction processing.
Figure 9:
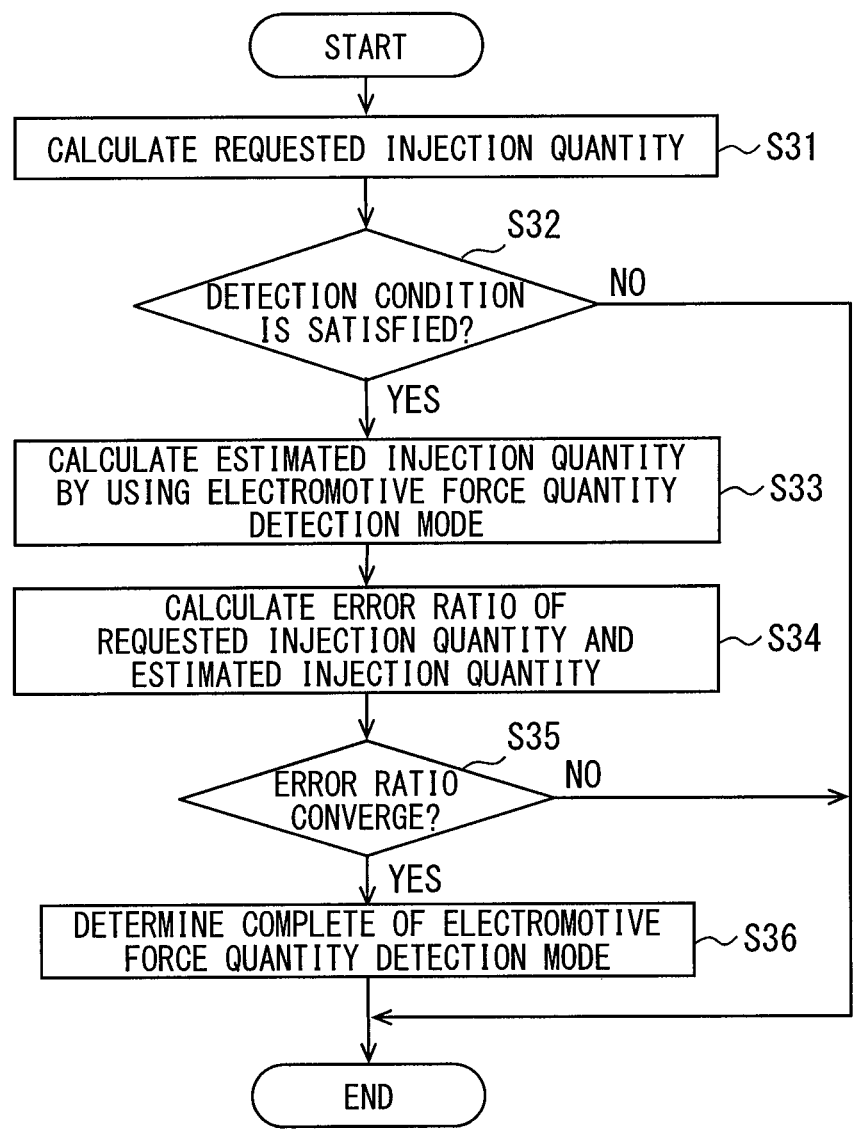
FIG. 9 is a flowchart showing initial correction in an electromotive force quantity detection mode.
Figure 10:
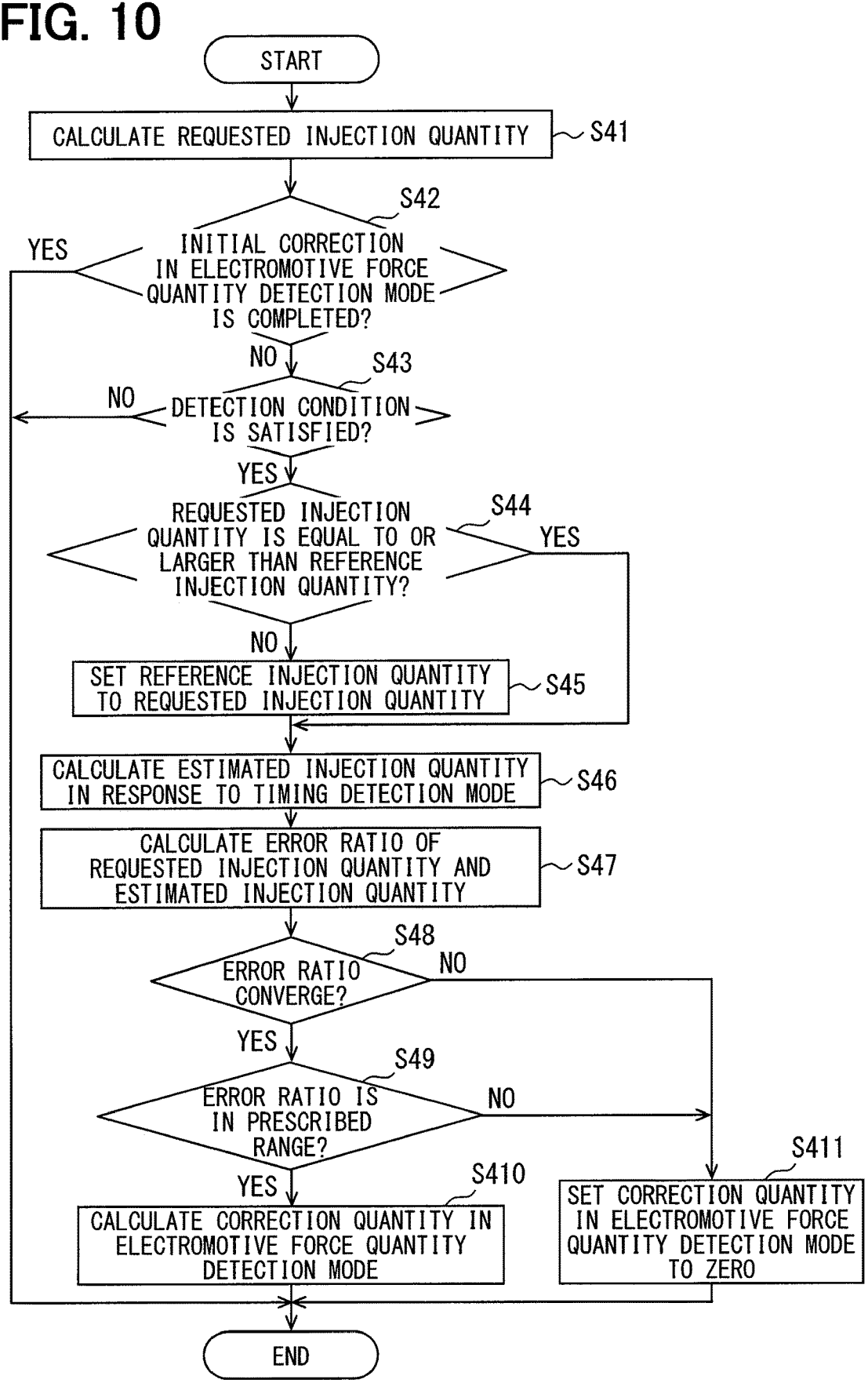
FIG. 10 is a flowchart showing initial correction of a voltage inflection point time.

Initial correction of a requested injection quantity is explained hereunder in reference to FIGS. 8 to 10. As stated earlier, either of the timing detection mode and the electromotive force quantity detection mode is selected in response to a requested injection quantity. Since the difference between a requested injection quantity and an actual injection quantity is caused by various factors however, it is necessary to correct the requested injection quantity in order to bring the requested injection quantity and the actual injection quantity close to each other. Moreover, since the requested injection quantity is in the detection range of the timing detection mode before the requested injection quantity is corrected, the timing detection mode is selected in some cases.

When a difference exists between a requested injection quantity and an actual injection quantity however, the actual injection quantity may not be in the detection range of the timing detection mode undesirably. Consequently, it is necessary to initially correct the requested injection quantity by the electromotive force quantity detection mode firstly before the timing detection mode is executed.

The correction processing shown in FIG. 8 is executed repeatedly for a short period of time in the state of the power-up of the control circuit 21 until the correction processing is determined to be completed. At S21, initial correction in the electromotive force quantity detection mode is executed and the process proceeds to S22. By executing the initial correction in the electromotive force quantity detection mode, a requested injection quantity can be corrected to a requested injection quantity for timing detection. By using the corrected requested injection quantity, whether or not the corrected injection quantity is in the detection range of the timing detection mode can be determined.

At S22, the initial correction of a voltage inflection point time Tdiff is executed by using a valve closing timing of the timing detection mode and the process proceeds to S23. Since the detection accuracy of the timing detection mode is superior, the voltage inflection point time Tdiff is corrected by using the valve closing timing of the timing detection mode excellent in detection accuracy. As a result, the detection accuracy of the valve closing timing by the electromotive force quantity detection mode can be improved.

At S23, a requested injection quantity is corrected by using the corrected voltage inflection point time Tdiff and the process finishes. Since the detection accuracy of the valve closing timing by the electromotive force quantity detection mode is improved by the correction as stated above, the difference between a requested injection quantity and an estimated injection quantity can be reduced by correcting the requested injection quantity by using the corrected voltage inflection point time Tdiff. As a result, injection accuracy can be improved.

Concrete control of initial correction in the electromotive force quantity detection mode is explained hereunder in reference to FIG. 9. The initial correction shown in FIG. 9 is processing corresponding to S21 in FIG. 8. The correction processing shown in FIG. 9 is executed repeatedly for a short period of time in the state of the power-up of the control circuit 21 until the electromotive force quantity detection is determined to be completed. At S31, a requested injection quantity of a fuel is calculated on the basis of a load and a machine rotational speed of an internal combustion engine E and the process proceeds to S32.

At S32, whether or not a detection condition is satisfied is determined and the process proceeds to S33 when the detection condition is satisfied and the process finishes when the detection condition is not satisfied. As the detection condition, a condition suitable for detecting a valve closing timing by the electromotive force quantity detection mode is set. The detection condition is satisfied for example when an injection interval of a prescribed time or longer is secured. The reason is that an injection quantity may deviate undesirably by the influence of a residual magnetic force when an injection interval of a prescribed time or longer is not secured.

At S33, since the detection condition is satisfied, an estimated injection quantity is calculated by using a valve closing timing detected by the electromotive force quantity detection mode and the process proceeds to S34. Since a voltage inflection point time Tdiff detected by the electromotive force quantity detection mode has a correlation with an injection quantity as stated earlier, an estimated injection quantity can be calculated. Further, when an estimated injection quantity is calculated, it is preferable to estimate the estimated injection quantity by using not only a valve closing timing but also parameters having a correlation with an actual injection quantity. The parameters are a fuel pressure and a conduction time for example. The reason why a fuel pressure is used is to take the influence of a valve opening force difference caused by the difference of the fuel pressure into consideration. The reason why a conduction time is used is to take a charged energy difference caused by the difference of the conduction time into consideration. An estimated injection quantity therefore is calculated from a three-dimensional map of a voltage inflection point time Tdiff, a conduction time Ti, and a fuel pressure.

At S34, an error ratio is calculated in order to correct a requested injection quantity so as to reduce the difference between the requested injection quantity and an estimated injection quantity and the process proceeds to S35. The error ratio is a correction coefficient and is calculated as a ratio of the sum of a corrected flow rate and a flow rate this time to a requested injection quantity. For example, an error ratio is calculated through the following expression (1). Here, the corrected flow rate is a value obtained by dividing a requested injection quantity by a previous error ratio. An error flow rate is a value representing a deviation and is the difference between a requested injection quantity and an estimated injection quantity.

$$\text{Error ratio } K = \text{Requested flow rate}/\{\text{Corrected flow rate} + \text{Error flow rate this time}\} = \text{Requested flow rate}/\{(\text{Requested flow rate}/\text{Previous error ratio}) + \text{Error flow rate this time}\} \quad (1)$$

At S35, whether or not an error ratio converges is determined and the process proceeds to S36 when the error ratio converges and the process finishes when the error ratio does not converge. The case where the error ratio converges means for example the case where a state of keeping an error ratio within a prescribed range lasts for a certain period of time. Since a previous error ratio is involved in the calculation of an error ratio shown in the expression (1), a coefficient usable for correction can be set by making an error ratio converge.

At S36, since the error ratio converges, information showing that the calculation of a correction coefficient required for correction by the electromotive force quantity detection mode is completed is written in a memory and the process finishes. In other words, a flag showing the completion of the correction processing shown in FIG. 8 is written. As a result, the correction processing is completed and the selection processing shown in FIG. 6 can be executed.

Consequently, by correcting a requested injection quantity by using an error ratio K, the requested injection quantity can come close to an estimated injection quantity. Specifically, a relationship between an injection command pulse width Ti and an injection quantity Q is set by using an error ratio. As a result, it is possible to: initially set a relationship between an injection command pulse width Ti and an injection quantity Q corresponding to an injection characteristic of the fuel injection valve 10; and correct the relationship between the injection command pulse width Ti and the injection quantity Q. Successively, by using a map defining the initially set relationship between the injection command pulse width Ti and the injection quantity Q, a requested injection command pulse width Tireq corresponding to a requested injection quantity Qreq is calculated.

Concrete control of initial correction of the voltage inflection point time Tdiff is explained hereunder in reference to FIG. 10. The initial correction shown in FIG. 10 is processing corresponding to S22 in FIG. 8. The correction processing shown in FIG. 10 is executed repeatedly for a short period of time in the state of the power-up of the control circuit 21 until the initial correction of the voltage inflection point time Tdiff is determined to be completed. At S41, a requested injection quantity of a fuel is calculated on the basis of a load and a machine rotational speed of an internal combustion engine E and the process proceeds to S42.

At S42, whether or not the correction of the voltage inflection point time Tdiff by the timing detection mode is completed is determined and the process finishes when the correction is completed and proceeds to S43 when the correction is not completed. The case where the correction of the voltage inflection point time Tdiff by the timing detection mode is completed represents the state where a correction quantity of the voltage inflection point time Tdiff is decided already through the process. Both the case where a correction quantity is decided already and the case where the voltage inflection point time Tdiff is corrected once during a trip this time are regarded as the case where the correction is completed. In other words, when the correction quantity of the voltage inflection point time Tdiff is not decided at least during one trip, the process proceeds to S43.

At S43, whether or not a detection condition is satisfied is determined and the process proceeds to S44 when the detection condition is satisfied and finishes when the detection condition is not satisfied. As the detection condition, a condition suitable for detecting a valve closing timing by the timing detection mode is set. The detection condition is satisfied for example when an injection interval of a prescribed time or longer is secured. The reason is that an injection quantity may deviate undesirably by the influence of a residual magnetic force when an injection interval of a prescribed time or longer is not secured.

At S44, whether or not a requested injection quantity is equal to or larger than a reference injection quantity is determined and the process proceeds to S46 when the requested injection quantity is equal to or larger than the reference injection quantity and proceeds to S45 when the requested injection quantity is not equal to or larger than the reference injection quantity. The reference injection quantity is set at a lower limit that allows a valve closing timing to be detected by the timing detection mode as shown in FIG. 7.

At S45, the reference injection quantity is set at the requested injection quantity and the process proceeds to S46. A valve closing timing cannot be detected by the timing detection mode unless the requested injection quantity is equal to or larger than the reference injection quantity. When the requested injection quantity is not equal to or larger than the reference injection quantity therefore, the level of the requested injection quantity is raised and the detection accuracy by the timing detection mode is secured.

At S46, an estimated injection quantity is calculated by using a valve closing timing detected by the timing detection mode and the process proceeds to S47. Since a valve closing timing detected by the timing detection mode has a correlation with an injection quantity as stated earlier, an estimated injection quantity can be calculated. Further, when an estimated injection quantity is calculated, it is preferable to estimate the estimated injection quantity by using not only the valve closing timing but also other parameters having a correlation with an actual injection quantity. The other parameters are for example a fuel pressure and a conduction time as stated earlier. As a result, an estimated injection quantity is calculated from a three-dimensional map of a valve closing timing, a conduction time Ti, and a fuel pressure.

At S47, an error ratio is calculated in order to correct a requested injection quantity so as to reduce the difference between the requested injection quantity and an estimated injection quantity and the process proceeds to S48. The error ratio is calculated through the expression (1) similarly as described above.

At S48, whether or not the error ratio converges is determined and the process proceeds to S49 when the error ratio converges and proceeds to S411 when the error ratio does not converge.

At S49, whether or not the converged error ratio is in a prescribed range is determined and the process proceeds to S410 when the converged error ratio is in the prescribed range and proceeds to S411 when the converged error ratio is not in the prescribed range. At S410, a correction quantity for correcting a voltage inflection point time Tdiff in the electromotive force quantity detection mode is calculated and the process finishes. At S411, since the error ratio converges and moreover the error ratio is in the prescribed range, the voltage inflection point time Tdiff can be corrected. In contrast, at S410, since the error ratio either does not converge or is not in the prescribed range, a correctable range is exceeded. The voltage inflection point time Tdiff is regarded as not correctable therefore and the correction quantity is set at zero.

The correction quantity is a value set so as to reduce the difference between an estimated injection quantity estimated by using a valve closing timing detected by the timing detection mode and an estimated injection quantity estimated by using a valve closing timing detected by the electromotive force quantity detection mode. Further, the correction quantity is calculated as an offset quantity to a voltage inflection point time Tdiff. By offsetting a voltage inflection point time Tdiff by using the correction quantity therefore, the correction can be completed. Such a correction quantity is set preferably at an average value of a plurality of correction quantities calculated multiple times.

As explained above, the fuel injection control device 20 according to the present embodiment can execute either of an electromotive force quantity detection mode and a timing detection mode. Consequently, the valve closing detection unit 54 can be downsized further than a configuration of execute both of the modes simultaneously. The timing detection mode is superior to the electromotive force quantity detection mode in detection accuracy but has a detection range narrower than the electromotive force quantity detection mode. Thus the control circuit 21 calculates a correction coefficient for correcting a valve closing timing detected by the electromotive force quantity detection mode by using a valve closing timing detected by the timing detection mode. As a result, the valve closing timing detected by the electromotive force quantity detection mode can be corrected by using a valve closing timing of the timing detection mode of good detection accuracy. The detection accuracy of the electromotive force quantity detection mode therefore can be improved. As a result, a valve closing timing can be detected by the electromotive force quantity detection mode of an improved accuracy even in a detection range not detectable by the timing detection mode. Then the control circuit 21 calculates an estimated injection quantity by using not a valve closing timing detected by the electromotive force quantity detection mode but a valve closing timing after corrected by the correction coefficient. As a result, the accuracy of an estimated injection quantity can be improved more than a valve closing timing detected by the electromotive force quantity detection mode.

Moreover, in the present embodiment, an estimated injection quantity is estimated by using a valve closing timing and parameters having a correlation with an actual injection quantity. As a result, the estimation accuracy of an estimated injection quantity can be improved.

Further, in the present embodiment, a correction coefficient calculated is for correcting a valve closing timing of the electromotive force quantity detection mode by using the difference between an estimated injection quantity estimated by using a valve closing timing detected by the timing detection mode and an estimated injection quantity estimated by using the valve closing timing detected by the electromotive force quantity detection mode. When a deviation exists between valve closing timings detected by different detection modes, the deviation causes a deviation between estimated injection quantities. A voltage inflection point time Tdiff corresponding to the deviation of the estimated injection quantities can be obtained by conversion. By using estimated injection quantities corresponding to different detection modes therefore, a correction coefficient of the voltage inflection point time Tdiff can be calculated.

Furthermore, in the present embodiment, an offset quantity to a voltage inflection point time Tdiff detected by the electromotive force quantity detection mode is calculated as a correction coefficient. As a result, correction can be completed only by deviating the detected voltage inflection point time Tdiff by the offset quantity. It is therefore possible to complete the correction through simple computation and reduce a computation load caused by the correction.

Moreover, in the present embodiment, an average value of a plurality of correction quantities calculated multiple times is calculated as an actually used correction quantity. As a result, even when correction quantities calculated multiple times vary, a final correction quantity can be calculated in consideration of the variation.

In addition, in the present embodiment, while a timing detection mode is selected in order to calculate a correction quantity, a prescribed reference injection quantity is set at a requested injection quantity when the requested injection quantity is smaller than the reference injection quantity. As a result, when the timing detection mode is selected, the requested injection quantity is equal to or larger than the reference injection quantity. In other words, when the timing detection mode is selected, the level of a minimum conduction time is raised. Since the detection range of the timing detection mode is equal to or larger than the reference injection quantity, when a correction quantity is calculated, a valve closing timing can be detected by the timing detection mode without fail.

Still further, in the present embodiment, a voltage inflection point time Tdiff is corrected by using a correction quantity when an error ratio is in a prescribed range but is not corrected by using the correction quantity when the error ratio is not in the prescribed range. When an error ratio is not in a prescribed range, a valve closing timing may not be detected well by a timing detection mode for any reason undesirably. On such an occasion, it is better not to execute correction and hence a voltage inflection point time Tdiff is not corrected by using a correction quantity. As a result, the deterioration of detection accuracy caused by correction can be inhibited.

Yet further, in the present embodiment, a correction quantity of a voltage inflection point time Tdiff, which is a correction coefficient, is calculated at least once per one trip. As a result, even when a correction quantity varies at every trip, namely at each startup, by aging or the like, the variation can be followed. The detection accuracy of a valve closing timing therefore can be maintained by the correction.

Other Embodiments

Although preferred embodiments of the present disclosure have been described above, the present disclosure is not limited to the above-described embodiments, and various modifications are contemplated as exemplified below. The present disclosure is intended to cover various modification and equivalent arrangements.

It should be understood that the configurations described in the above-described embodiments are example configurations, and the present disclosure is not limited to the foregoing descriptions. In addition, while the various combinations and configurations, which are preferred, other combinations and configurations, including more, less or only a single element, are also within the spirit and scope of the present disclosure. The scope of the present disclosure encompasses claims and various modifications of claims within equivalents thereof.

Although a detection mode is switched by using a ratio of a requested injection quantity and a reference ratio in the first embodiment stated earlier, the present disclosure is not limited to a configuration of using a reference ratio. For example, it is also possible to switch a detection mode by using a prescribed reference value. Specifically, it is also possible to: select the timing detection mode when a requested injection quantity is larger than a prescribed reference injection quantity in partial lift injection; and select the electromotive force quantity detection mode when the requested injection quantity is smaller than the reference injection quantity. Since a process of calculating a ratio is unnecessary in this way, the calculation load of the control circuit 21 can be reduced.

Although an offset quantity is used as a correction coefficient in the first embodiment stated above, the correction coefficient is not limited to the offset quantity. For example, the control circuit 21 functioning as a correction unit may calculate an error ratio that is a ratio of a requested injection quantity and an estimated injection quantity as a correction coefficient. By using an error ratio, comparison can be executed by using the ratio even when detection conditions are not identical.

Although the fuel injection valve 10 is configured so as to have the valve body 12 and the movable core 15 individually in the first embodiment stated earlier, the fuel injection valve 10 may also be configured so as to have the valve body 12 and the movable core 15 integrally. If they are configured integrally, the valve body 12 is displaced together with the movable core 15 in the valve opening direction and shifts to valve opening when the movable core 15 is attracted.

Although the fuel injection valve 10 is configured so as to start the shift of the valve body 12 at the same time as the start of the shift of the movable core 15 in the first embodiment stated earlier, the fuel injection valve 10 is not limited to such a configuration. For example, the fuel injection valve 10 may be configured so that: the valve body 12 may not start valve opening even when the movable core 15 starts shifting; and the movable core 15 may engage with the valve body 12 and start valve opening at the time when the movable core 15 moves by a prescribed distance.

The functions exhibited by the fuel injection control device 20 in the first embodiment stated earlier may be exhibited by hardware and software, those being different from those stated earlier, or a combination of them. The control device for example may communicate with another control device and the other control device may implement a part or the whole of processing. When a control device includes an electronic circuit, the control device may include a digital circuit or an analog circuit including many logic circuits.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

The invention claimed is:

1. A fuel injection control device to control a fuel injection valve including a drive coil to generate an electromagnetic attraction force by being conducted, a movable core to be attracted by the electromagnetic attraction force of the drive coil, and a valve body to separate from a valve seat and open a fuel passage by attracting the movable core from the state of contact with the valve seat and thus closing the fuel passage, the fuel injection control device comprising:
   an injection control unit to execute full lift injection of controlling the drive coil by an injection command pulse allowing a lift quantity of the valve body to reach a full lift position and partial lift injection of controlling the drive coil by an injection command pulse allowing the lift quantity of the valve body not to reach the full lift position;

a voltage detection unit to detect the change of an induced electromotive force generated in the drive coil by intercepting an electric current supplied to the drive coil and displacing the valve body in the direction of valve closing as a voltage value;

a valve closing detection unit to detect a valve closing timing by using either of an electromotive force quantity detection mode of detecting the valve closing timing by comparing an accumulated quantity of voltage values detected by the voltage detection unit and a prescribed reference quantity and a timing detection mode of detecting an inflection point of a waveform of a voltage value detected by the voltage detection unit as a valve closing timing in order to detect the valve closing timing when the valve body proceeds to valve closing in the partial lift injection;

a selection unit to select either of the electromotive force quantity detection mode and the timing detection mode for detecting the valve closing timing;

an estimation unit to calculate an estimated injection quantity by using the valve closing timing detected by the valve closing detection unit; and a correction unit to calculate a correction coefficient for correcting the valve closing timing detected by the electromotive force quantity detection mode by using the valve closing timing detected by the timing detection mode, wherein the estimation unit calculates the estimated injection quantity by using the valve closing timing after corrected by using the correction coefficient when the electromotive force quantity detection mode is selected by the selection unit and the valve closing timing is detected by the electromotive force quantity detection mode.

2. The fuel injection control device according to claim 1, wherein
the estimation unit estimates the estimated injection quantity by using the valve closing timing and parameters having a correlation with an actual injection quantity.

3. The fuel injection control device according to claim 1, wherein
the correction unit calculates the correction coefficient by using the difference between the estimated injection quantity which the estimation unit estimates by using the valve closing timing detected by the timing detection mode and the estimated injection quantity which the estimation unit estimates by using the valve closing timing detected by the electromotive force quantity detection mode.

4. The fuel injection control device according to claim 1, wherein
the correction unit calculates the correction coefficient by using an error ratio that is a ratio of a requested injection quantity and the estimated injection quantity.

5. The fuel injection control device according to claim 1, wherein
the correction unit calculates an offset quantity to the valve closing timing detected by the electromotive force quantity detection mode as the correction coefficient.

6. The fuel injection control device according to claim 1, wherein
the estimation unit estimates the estimated injection quantity by using the valve closing timing after corrected by using an average value of a plurality of the correction coefficients calculated multiple times when the electromotive force quantity detection mode is selected by the selection unit and the valve closing timing is detected by the electromotive force quantity detection mode.

7. The fuel injection control device according to claim 1, wherein
the injection control unit sets a prescribed reference injection quantity at a requested injection quantity when the requested injection quantity is smaller than the reference injection quantity while the timing detection mode is selected in order to calculate the correction coefficient by the correction unit.

8. The fuel injection control device according to claim 1, wherein
the estimation unit
corrects the valve closing timing by using the correction coefficient when an error ratio that is a ratio of a requested injection quantity and the estimated injection quantity is in a prescribed range, and
does not correct the valve closing timing by the correction coefficient when the error ratio is not in the prescribed range.

9. The fuel injection control device according to claim 1, wherein
the correction unit calculates the correction coefficient at least once per one trip.

* * * * *